(12) United States Patent
Zhou

(10) Patent No.: US 6,670,013 B2
(45) Date of Patent: Dec. 30, 2003

(54) OPTICAL RECORDING MEDIUM AND USE OF SUCH OPTICAL RECORDING MEDIUM

(75) Inventor: Guo-Fu Zhou, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 69 days.

(21) Appl. No.: 09/833,426

(22) Filed: Apr. 12, 2001

(65) Prior Publication Data

US 2001/0033991 A1 Oct. 25, 2001

(30) Foreign Application Priority Data

Apr. 20, 2000 (EP) ................................ 00201488

(51) Int. Cl.$^7$ .............................................. B32B 3/02
(52) U.S. Cl. .................... 428/64.1; 428/64.4; 428/64.5; 428/270.13
(58) Field of Search ................... 428/64.1, 64.4, 428/64.5, 64.6, 913; 430/270.13, 495.1, 945

(56) References Cited

U.S. PATENT DOCUMENTS

| | | | |
|---|---|---|---|
| 5,965,229 A | 10/1999 | Zhou et al. ............... | 428/64.4 |
| 6,115,352 A * | 9/2000 | Ohno ....................... | 369/275.4 |
| 6,312,780 B1 * | 11/2001 | Kasami .................... | 428/64.1 |
| 6,416,837 B1 * | 7/2002 | Kojima .................... | 428/64.1 |
| 6,511,788 B1 * | 1/2003 | Yasuda ................. | 428/270.13 |

FOREIGN PATENT DOCUMENTS

| | | | | |
|---|---|---|---|---|
| EP | 0431489 A2 | 6/1991 | ........... | G11B/7/00 |
| EP | 0945860 A2 | 9/1999 | ........... | G11B/7/24 |
| EP | 0980068 A1 | 2/2000 | ........... | G11B/7/26 |
| JP | 05062249 | 3/1993 | ........... | G11B/7/24 |
| JP | 06195747 | 7/1994 | ........... | G11B/7/24 |
| JP | 09161316 A | 6/1997 | ........... | G11B/7/24 |
| WO | WO9745830 | 12/1997 | ........... | G10L/5/00 |

* cited by examiner

Primary Examiner—Elizabeth Mulvaney
(74) Attorney, Agent, or Firm—Michael E. Belk

(57) ABSTRACT

An optical recording medium. The optical recording medium has a substrate and a stack of layers provided thereon. The stack of layers includes a phase change recording layer, having a melting point $T_{mp}$, sandwiched between a first and a second dielectric layer. The stack of layers further includes a crystallization-accelerating layer in contact with the recording layer, a reflective layer, and an optional cover layer. The crystallization-accelerating layer may of a binary metal alloy or a semiconductor and has a melting point $T_{mg}$ at least 250° C. higher than the melting point $T_{mp}$ of the recording layer and may have a crystal structure similar to the crystalline state of the recording layer.

19 Claims, 1 Drawing Sheet

OPTICAL RECORDING MEDIUM AND USE OF SUCH OPTICAL RECORDING MEDIUM

BACKGROUND OF THE INVENTION

1. Technical Field

The invention relates to an optical recording medium having a substrate and a stack of layers provided thereon, the stack comprising a recording layer, having a melting point $T_{mp}$ and being able to change between an amorphous and a crystalline state, sandwiched between a first and a second dielectric layer, the first being adjacent to the substrate, a crystallization accelerating layer being interposed in contact with the recording layer, and a reflective layer.

The invention also relates to the use of such an optical recording medium.

2. Related Art

An optical recording medium of the type mentioned in the opening paragraph is known from Japanese patent application JP-09161316 A. In the known medium the state of the recording layer locally changes from crystalline to amorphous when data are optically recorded.

Optical data storage based on the phase change principle is attractive, because it combines the possibilities of direct overwrite (DOW) and high storage density with easy compatibility with read-only optical data storage systems. Phase-change optical recording involves the formation of submicrometer-sized amorphous recording marks in a crystalline film using a focused relatively high power laser-light beam. During recording information, the medium is moved with respect to the focused laser-light beam that is modulated in accordance with the information to be recorded. Due to this, quenching takes place in the phase-change recording layer and causes the formation of amorphous information bits in the exposed areas of the recording layer that remains crystalline in the unexposed areas. Erasure of written amorphous marks is realized by recrystallizing through heating with the same laser at an intermediate power level, without melting the recording layer. The amorphous marks represent the data bits, which can be read, e.g. via the substrate, by a low-power focused laser-light beam. Reflection differences of the amorphous marks with respect to the crystalline recording layer bring about a modulated laser-light beam which is subsequently converted by a detector into a modulated photocurrent in accordance with the recorded digital information.

One of the most important demands in phase-change optical recording is a high data rate, which means that data can be written in and read from the medium with a rate of at least 30 Mbits/s. A high data rate requires the recording layer to have a high crystallization rate, i.e. a short crystallization time. To ensure that the previously recorded amorphous marks can be crystallized during direct overwrite, the recording layer should have a proper crystallization time to match the velocity of the medium relative to the laser-light beam. If the crystallization speed is not high enough to match the velocity of the medium relative to the laser-light beam the amorphous marks from the previous recording, representing old data, cannot be completely erased, meaning recrystallized, during DOW. This causes a high noise level. A high crystallization speed is particularly required in high-density recording and high data rate applications, such as disc-shaped DVD+RW, DVR-red and blue which are abbreviations of new generation high density Digital Versatile Disc+RW, where RW refers to the rewritability of such discs, and Digital Video Recording optical storage discs, where red and blue refer to the used laser wavelength. For these new discs the complete erasure time (CET) has to be at most 60 ns. CET is defined as the minimum duration of the erasing pulse for complete crystallization of a written amorphous mark in a crystalline environment, which is measured statically. For DVD+RW, which has a 4.7 GB recording density per 120 mm disk, a user data bit rate of 33 Mbits/s is needed, and for DVR-red said rate is 35 Mbits/s. For rewritable phase change optical recording systems such as DVR-blue, a user data rate higher than 50 Mbits/s is required.

The known medium of the phase-change type comprises a disc-shaped substrate carrying a stack of layers consisting, in succession, of a first dielectric layer, a $Sb_2Te_3$ layer as crystallization accelerating layer, a Sb layer as a composition correcting layer, a recording layer of a phase-change $Sb_{72}Te_{28}$ alloy, a second dielectric layer and a metal reflective layer. Such a stack of layers can be referred to as an INP'PIM structure, wherein M represents a reflective or mirror layer, I represents a dielectric layer and P represents a phase-change recording layer while P' represents a composition correction layer which mixes with the recording layer at first recording. A crystallization accelerating layer N of $Sb_2Te_3$, has been arranged between the first dielectric layer and the correction and the recording layer to achieve a fast crystallization of the medium during erasing information in the medium by means of a laser-light beam. In the known recording medium the N layer has a melting point of 618° C., only 68° C. higher than the melting point 550° C. of the P layer. The melting point of the known N layer is relatively close to the melting point of the P layer causing the N layer to dissolve in the correction and recording layer P'P after one or at best a few recording/erasure cycles, whereafter the crystallization accelerating layer N is no longer present and its crystallization-accelerating action is lost.

For complete erasure of an amorphous mark, two processes occur, i.e. nucleation and grain (crystallite) growth. An investigation of the known recording medium has revealed that the known crystallization-accelerating layer N is merely a nucleation-promoting layer.

It is a disadvantage of the known medium that its crystallization accelerating layer only functions for at most a few recording and erasing cycles. This is not sufficient for modern erasable media, which require a stable performance for at least a thousand of recording and erasing cycles.

SUMMARY OF THE INVENTION

It is an object of the invention to provide an optical recording medium of the kind described in the opening paragraph, which is suitable for high speed rewritable optical recording, having a CET-value of at most 60 ns.

It is another object of the invention to provide an optical recording medium of the kind described in the opening paragraph, which is suitable for rewritable optical recording, having a stable performance for at least $10^3$ recording and erasing cycles.

This object is achieved in accordance with the invention by an optical recording medium as described in the opening paragraph, which is characterized in that the crystallization accelerating layer comprises a material selected from the group consisting of binary metal alloys, semiconductors elements and semiconductor alloys and has a melting point $T_{mg}$ at least 250° C. higher than the melting point $T_{mp}$ of the recording layer and has a crystal structure similar to the crystalline state of the recording layer.

The crystallization accelerating layer according to the invention, which will also be abbreviated as G, yields a high crystallization speed of the recording layer because the amorphous marks of the recording layer are in contact with the G-layer. This accelerates the crystallite growth process, leading to a higher crystallization speed. Especially because the crystal structure of the G-layer is similar to, or even the same as, the structure of the crystalline state of the recording layer the crystallization rate of amorphous marks is advantageously increased. The crystal structure of the G-layer then serves as a very good grain growth initialization or nucleation layer for crystallite growth in the recording layer. The G-layer is always present adjacent to a thermally isolating layer, here the first or second dielectric layer, because a stack having a G-layer between the recording layer and the substrate or the reflection layer cannot realize the desired thermal properties.

An advantage of the G-layer, comprising a material selected from the group consisting of binary metal alloys, semiconductors and semiconductor alloys, is that it has a high melting point. This counteracts dissolving of the G-layer in the recording layer and maintenance of the crystalline structure for a large number of recording and erasing cycles. During recording, the maximum temperature in the recording layer is about 800° C., which is about 1.4 times $T_{mp}$ for a recording layer with a $T_{mp}$ of 550° C. This may be deduced from a temperature calculation based on the presented laser energy during recording and the physical properties of the stack. The melting temperature $T_{mg}$ of the G-layer has to be above this maximum temperature so that the G-layer remains in crystalline state when the recording layer is melted.

Therefore, the melting temperature difference between recording layer and G-layer should be 250° C. or larger, but preferably 300° C. or larger, taking into consideration a safety margin.

Preferred materials, which may be used as G-layer, are PbTe, $Ag_2Te$, CrTe, Ge and Si.

In an embodiment of the recording medium the G-layer is arranged between the recording layer and the second dielectric layer. The thickness of the G-layer may be chosen between 0.1 and 10 nm. The thermal conductivity of the crystallization-accelerating layer is generally comparable to that of the recording layer, which is an alloy of metals. However this only has a small effect on the thermal behaviour of the stack because the thickness of the G-layer is generally relatively small compared to the other layers in the stack. This facilitates the thermal design of the stack.

In another embodiment the crystallization time is reduced further in that a second G-layer is arranged between the recording layer and the first dielectric layer. Thus a G-layer is arranged on both sides of the recording layer. The second G-layer may be of a material similar or identical to the material of the other G-layer. The crystallization time is reduced because now a crystalline layer, which accelerates the crystallite growth process, is present against the recorded amorphous mark on both sides. The thicknesses of the G-layers are between 0.1 and 10 nm, preferably lower than 5 nm.

In a specific embodiment the two G-layers present on either side of the recording layer are substantially equal both in thickness and in composition. Equal in thickness means to within 10% of each other. The equality of the thicknesses is advantageous in the manufacturing of the medium. In general the stack is deposited by evaporation or by sputtering in a vacuum chamber, where substrates move stepwise along a series of stations having targets of different compositions. The dwell time at each station is about equal, and the thickness of the layer deposited at a station is determined in part by switching the deposition process on and off. Consequently, the deposition of a relatively thin layer may require less time than available at a station, whereas the deposition of a relatively thick layer may even require two adjacent stations having the same target. It is therefore advantageous to choose to replace a relatively thick layer and a relatively thin layer by two layers of about equal thickness and composition, thereby reducing the number of deposition stations and the manufacturing time of a stack.

In a specific embodiment the recording layer comprises an alloy of Q, In, Sb and Te, wherein Q is selected from the group consisting of Ag and Ge.

The preferred composition comprises $Q_a In_b Sb_c Te_d$ (in atomic percentages), wherein Q is selected from the group consisting of Ag and Ge;

$2 \leq a \leq 9$ $0 < b \leq 6$ $55 \leq c \leq 80$ $16 \leq d \leq 30$; a+b+c+d=100.

In another specific embodiment the recording layer comprises a compound of Ge, Sb and Te. The preferred composition of this compound is defined by the formula $Ge_{50x}Sb_{40-40x}Te_{60-10x}$ (in atomic percentages), wherein $0.166 \leq x \leq 0.444$;

the recording layer having a thickness of 5 to 35 nm;

This composition exists on a part of the line connecting the compounds GeTe and $Sb_2Te_3$ in the triangular Ge-Sb-Te composition diagram and includes the stoichiometric compounds $Ge_2Sb_2Te_5$ (x=4/9), $GeSb_2Te_4$ (x=2/7) and $GeSb_4Te_7$ (x=1/6). Especially these ternary stoichiometric compounds are preferred, because these materials crystallize rapidly since no segregation is required during crystallization.

The first and second dielectric layers are preferably made of a mixture of ZnS and $SiO_2$, e.g. $(ZnS)_{80}(SiO_2)_{20}$. The layers may alternatively be made of $SiO_2$, $TiO_2$, $Ta_2O_5$, ZnS, AlN and/or $Si_3N_4$. The dielectric layer through which the laser light enters the stack preferably has a thickness of 70 to (70+λ/2n) nm wherein n is the refractive index of the first dielectric layer and λ is the wavelength of the read/write laser-light beam. If the total thickness is smaller than 70 nm, the cyclability is reduced considerably. The cyclability is measured by the relative change of the optical contrast $M_0$ after a large number of DOW-cycles, e.g. $10^3$. The optical contrast $M_0$ is defined as $|R_C - R_A|/R_C$, where $R_C$ and $R_A$ are the reflections of the recording material in the crystalline and amorphous state respectively. Another way to define cyclability is related to jitter increase of the medium. Jitter is a measure of the distortion of the shape of a recording mark, and is measured as a time shift of rising and falling edges in the information signal. The jitter of the medium should be at a low, constant level during at least $10^3$ DOW-cycles.

As mentioned above the total thickness of the first dielectric layer is preferably smaller than (70+λ/2n) nm. A larger total thickness does not further increase the cyclability and is more expensive to make. If for example the wavelength is equal to 630 nm and the refractive index is 1.5, the thickness range extends from 70 nm to 280 nm.

The dielectric layer, which is closest to the reflective layer, has a thickness of 10 to 40 nm. Preferably the thickness of the dielectric layer adjacent to the reflective layer is larger than or equal to 15 nm. A smaller thickness results in an increased cooling rate of the recording layer and, consequently, an undesirable increase in the write power. The thickness is preferably smaller than 40 nm. A larger thickness decreases the thermal contact between the recording layer and the reflective layer too much, resulting in too low a cooling rate of the recording layer and a worse recording performance.

The reflective layer may comprise metals such as Al, Ti, Au, Ni, Cu, Ag and Cr, and alloys of these metals. The reflective layer preferably has a thickness of 60 to 120 nm.

Both the reflective layers and the dielectric layers generally have been provided by vapour deposition or sputtering.

Optionally an outermost layer may be present on the stack as a cover layer that protects the underlying layers from the environment. The cover layer is made of, for example, an UV light-cured poly(meth)acrylate.

Another specific embodiment is characterized in that the reflective layer is present between the substrate and the first dielectric layer. Optionally a cover layer, that is transparent for laser-light and has a surface which allows optical recording of information into and reading of information from the underlying recording layer with a focused laser-light beam is present on top of the stack. Thus in this embodiment the optical recording medium is written in and read out through the cover layer. This method is used in the new DVR discs that were mentioned above. The cover layer of a DVR disc has a thickness of about 100 micrometers. This cover layer allows the use, in optical disc recorders, of a read/write lens with a high numerical aperture that is necessary for high density recording and reading. Because the laser light enters the medium through the cover layer it may be necessary to adjust the thicknesses of the layers of the stack in order to optimize for optimal optical contrast between recorded and unrecorded areas.

The term high-speed recording, which was mentioned above, is to be understood to mean in this context a linear velocity of the medium relative to the laser-light beam of at least 7.2 m/s, which is six times the speed according to the Compact Disc standard. The use of an optical recording medium according to the invention is therefore advantageous because the crystallization rate is fast enough to permit at least this recording velocity. The important parameter is the CET (in ns), which is defined above. The CET is inversely proportional to the crystallization rate.

The substrate of the information medium generally is transparent to the laser wavelength, and is made, for example, of polycarbonate, polymethyl methacrylate (PMMA), amorphous polyolefin or glass. In a typical example, the substrate is disc-shaped and has a diameter of 120 mm and a thickness of 1.2 mm, 0.6 mm or 0.1 mm for respectively low, medium and high information density applications.

Alternatively, the substrate may be in the form of a synthetic resin flexible tape, made e.g. from a polyester film. This flexible tape, with a stack of layers deposited thereon, is called an optical tape and can be suited for use in an optical tape recorder, which is for example based on a fast spinning polygon. In such a device the reflected laser-light beam scans transversely across the tape surface.

The surface of the disc-shaped substrate on the side of the recording layer is, preferably, provided with a servotrack that can be scanned optically. This servotrack is often constituted by a spiral-shaped groove and is formed in the substrate by means of a mould during injection moulding or pressing. This groove can be alternatively formed in a replication process in a synthetic resin layer, for example, of an UV light-cured layer of acrylate, which is separately provided on the substrate. In high-density recording such a groove has a pitch e.g. of 0.5–0.8 μm and a width of about half the pitch.

High-density recording and erasing can be achieved by using a short-wavelength laser, e.g. with a wavelength of 675 nm or shorter (red to blue).

The phase change recording layer as well as the G-layer can be applied by vapour depositing or sputtering of a suitable target. The recording layer thus deposited is amorphous and exhibits a low reflection. In order to constitute a suitable recording layer having a high reflection, this layer must first be completely crystallized, which is commonly referred to as initialization. For this purpose, the recording layer can be heated in a furnace to a temperature just above the crystallization temperature of the e.g. Ge—In—Sb—Te or Ge—Sb—Te compound, e.g. 200° C. A synthetic resin substrate, such as polycarbonate, to which a high temperature may cause damage, can alternatively be heated by a laser-light beam of sufficient power. This can be realized, e.g. in a recorder, in which case a laser beam scans the moving recording layer. The amorphous layer is then locally heated to the temperature required for crystallizing the layer, without the substrate being subjected to a disadvantageous heat load.

If desired, an additional, optically transparent, metal layer M' can be interposed in the stack, thereby forming a so called MIRIM'-structure, wherein R represents a layer stack comprising a recording layer and at least one crystallization accelerating layer according to the present invention. Although the structure becomes more complicated, the additional metal layer increases the cooling rate of the recording layer as well as the optical contrast $M_0$.

BRIEF DESCRIPTION OF THE DRAWINGS

Embodiments of the optical recording medium of the invention will be described with reference to the drawings. In the drawings.

DETAILED DESCRIPTION OF THE INVENTION

Figure 1:
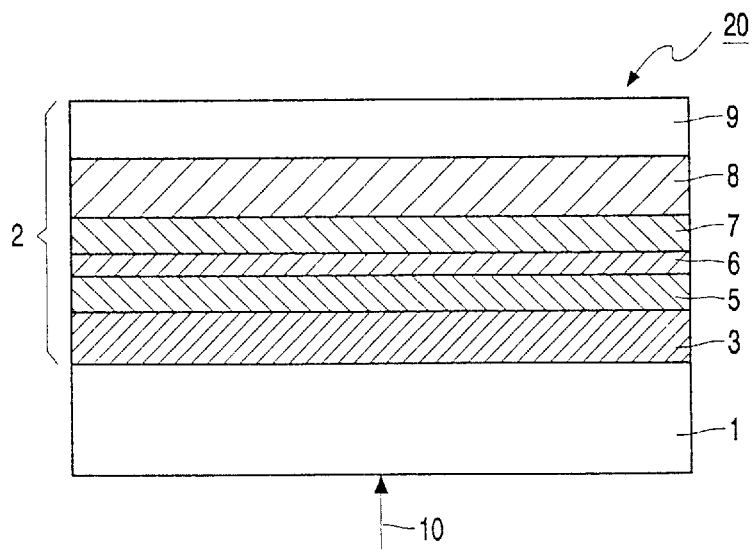
FIG. 1 shows a schematic cross sectional view of a first embodiment of the optical recording medium.

In FIG. 1 the optical recording medium 20 has a substrate 1 and a stack 2 of layers provided thereon. The substrate 1 may be made of, for example, a sheet of plastic, e.g. polycarbonate, or glass. In FIG. 1 the stack 2 comprises a phase change recording layer 5, having a melting point $T_{mp}$ and being able to change between an amorphous and a crystalline state, that is sandwiched between a first 3 and a second 7 dielectric layer, the first 3 being adjacent to the substrate 1. In this embodiment both the first dielectric layer 3 and the second dielectric layer 7 are made of the material $(ZnS)_{80}(SiO_2)_{20}$ and have a thickness of 125 nm and 20 nm respectively. A crystallization accelerating layer 6, abbreviated as G-layer, is interposed in contact with the recording layer 5, which comprises an alloy of Q, In, Sb and Te, wherein Q is selected from the group consisting of Ag and Ge. A reflective layer 8 is present on top of the stack 2. Reflective layer 8 is a 100 nm layer of Al or an aluminium alloy, e.g. AlCr or AlTi. The crystallization accelerating layer 6 comprises a binary metal alloy or a semiconductor element or semiconductor alloy and has a melting point $T_{mg}$ at least 250° C. higher than the melting point $T_{mp}$ of the recording layer 5. The crystal structure of these materials is similar to the crystalline state of the recording layer 5. In this embodiment the recording layer 5 is made of $Ge_{6.2}In_{3.2}Sb_{71.1}Te_{19.6}$, which has a thickness of 12 nm. The embodiment shown has a cover layer 9 that may be made of an organic material, e.g. a UV-cured resin. A focused laser-light beam with a wavelength λ=405 nm enters the medium through the substrate 1. This beam is diagrammatically illustrated by means of an arrow 10 in FIG. 1.

In this embodiment, when using PbTe as G-layer, which has a thickness of 3 nm, the CET has been measured to be equal to 40 ns, which is sufficiently short to allow high-speed recording. When no G-layer is present a minimal CET value of 48 ns can be obtained. Other preferred materials as G-layer are $Ag_2Te$, CrTe, Ge or Si. The melting points $T_{mg}$ of bulk PbTe, $Ag_2Te$, CrTe, Ge and Si are 914, 960, 1292, 936 and 1414° C. respectively. The write power for the medium is relatively low and is 9 mW at the entrance face of the medium at a relative speed between the radiation beam and the medium of 7.2 m/s. The $R_A$ and $R_C$ are measured to be 4.3% and 23% respectively.

The cyclability is measured as the number of rewrite cycles where the jitter has increased to 12% of the clock time $T_C$. The jitter is the standard deviation of the difference between the rising and falling edges in the information signal and the data clock recovered from the information signal. As an example, for a standard CD format written with the so-called EFM code at the CD speed of 1.2 m/s and clock time of 230 ns, the jitter should be lower than 28 ns. The number of overwrite cycles before deterioration of the medium becomes noticeable, e.g. the jitter has increased to 12% of the clock time, is larger than $10^3$. The jitter of a pattern read from the medium as a function of the overwrite cycle does not show a large overshoot.

During writing, the recording layer 5 of $Ge_{6.2}In_{3.2}Sb_{71.1}Te_{19.6}$ is heated to a temperature of about 750° C., well above its melting temperature, which is about 550° C. The temperature during recording is below the melting temperature of the G-layer 6 comprising PbTe. The high melting temperature of the material used for the G-layer neighbouring the recording layer 5 therefore results in an increased cyclability of the recording medium.

In application JP-09161316 A the crystallization accelerating layer N of $Sb_2Te_3$, which has a melting point of 618° C., is thus heated above its melting temperature, causing the atoms in the layer to become mobile. These atoms are then able to diffuse into the recording layer. The properties of the recording layer are affected by the influx of foreign atoms, resulting in a deterioration of the recording process.

Figure 2:
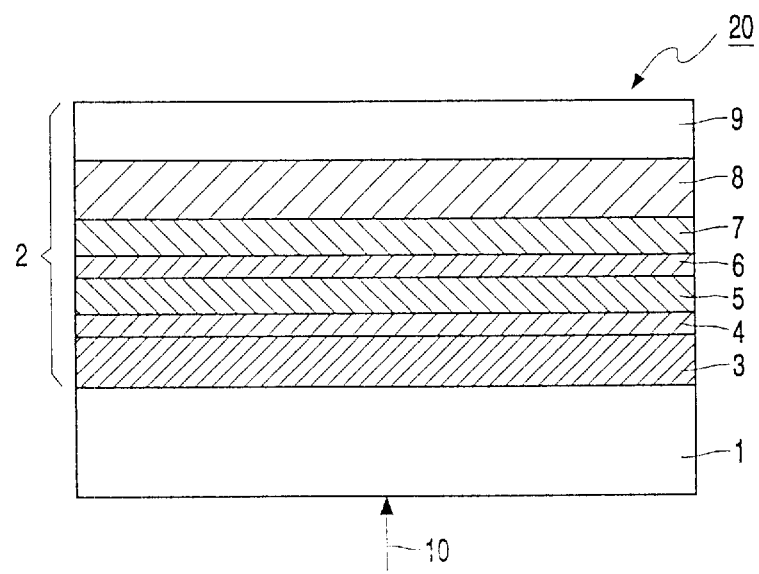
FIG. 2 shows a view as shown in FIG. 1 of a second embodiment.
Figure 3:
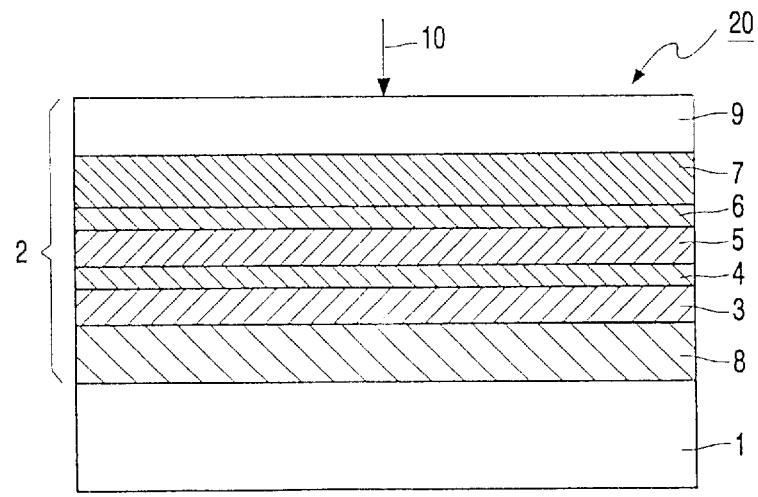
FIG. 3 shows a view as in FIG. 2 of a third embodiment.

In FIG. 2 and FIG. 3 corresponding reference numerals denote the same layers as in FIG. 1.

In FIG. 2 a second crystallization accelerating layer 4 similar to the crystallization accelerating layer 6 is arranged between the recording layer 5 and the first dielectric layer 3. Now G-layers 4, 6 are present on both sides adjacent to the recording layer 5. The G-layer 6 is made of PbTe and has a thickness of 1.5 nm. The second G-layer 4 is substantially equal both in thickness and in composition to the G-layer 6. The recording layer 5 has a thickness of 10 nm. Further the characteristics of the stack 2 are the same as in FIG. 1. The CET is measured to be 36 ns. The CET in this embodiment is smaller than in the embodiment with only one G-layer. The $R_A$ and $R_C$ are measured to be 4.6% and 22% respectively.

In FIG. 3 the reflective layer 8 is present between the substrate 1 and the first dielectric layer 3. In this embodiment the laser light 10 is entering the stack 2 through the cover layer 9 which has a thickness of 100 μm. The cover layer 9 has a uniform thickness, thereby improving the optical read and write performance in underlying recording layers when the read or write laser beam passes through said cover layer 9. For example a 100 m cover layer 9 is used for the new 60 mm radius Digital Video Recording (DVR) disc. This disc is recorded in and read out through this cover layer 9, which therefore has to be of good optical quality. Preferably, the cover layer 9 is 100+/−3 μm thick up to radius 58.5 mm. The cover layer 9 is made from a UV-cured resin. Dielectric layer 3 and 7 have a thickness of 20 nm and 125 nm respectively and are made of the same dielectric material as in FIG. 1. G-layer 4, 6 are made of the same material as in FIG. 2 and both have a thickness of 1.5 nm. Recording layer 5 has a thickness of 10 nm. For characteristics that are not specifically mentioned reference is made to the description of FIG. 1.

Preferably, for all embodiments, the surface of the disc-shaped substrate 1 on the side of the stack 2 is provided with a servotrack that can be scanned optically. This servotrack is often constituted by a spiral-shaped groove and is formed in the substrate by means of a mould during injection moulding or pressing. This groove can be alternatively formed in a replication process in a synthetic resin layer, for example, of an UV light-cured layer of acrylate, which is separately provided on the substrate 1. In high-density recording such a groove has a pitch e.g. of 0.5–0.8 μm and a width of about half the pitch.

In a modification of the recording medium of FIG. 3, the recording layer 5 comprises an alloy of Ge, Sb and Te, e.g. $Ge_2Sb_2Te_5$.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

According to the invention an optical recording medium is provided, which is suitable for high speed recording, e.g. with a possible data rate higher than 50 Mbits/s, and which is suitable for direct overwrite for a least $10^3$ times.

What is claimed is:

1. An optical recording medium having a substrate and a stack of layers provided thereon, the stack comprising a recording layer, a reflecting layer, a crystallization accelerating layer, a first dielectric layer, and a second dielectric layer, the substrate being optically transparent to a laser-light beam, the recording layer having a melting point $T_{mp}$ and being able to change between an amorphous and a crystalline state, the recording layer being disposed between the first and second dielectric layers, the recording layer being in direct mechanical contact with the first dielectric layer, the first dielectric layer being in direct mechanical contact with the substrate, the crystallization accelerating layer being in contact with the recording layer, the recording layer being disposed between the first dielectric layer and the crystallization accelerating layer, wherein the crystallization accelerating layer:

comprises a material selected from the group consisting of a binary metal alloy, a semiconductor element, and a semiconductor alloy;

has a melting point $T_{mg}$ at least 250° C. higher than the melting point $T_{mp}$ of the recording layer; and has a crystal structure similar to the crystalline state of the recording layer.

2. The optical recording medium of claim 1, wherein the crystallization accelerating layer comprises a material selected from the group consisting of PbTe, $Ag_2Te$, and CrTe.

3. The optical recording medium of claim 1, wherein the crystallization accelerating layer is disposed between the recording layer and the second dielectric layer.

4. An optical recording medium comprising a substrate and a stack of layers provided thereon, the substrate being optically transparent to a laser-light beam, the stack including in sequential order: a first dielectric layer, a first crystallization accelerating layer, a recording layer, a second crystallization accelerating layer, a second dielectric layer, and a reflecting layer, wherein a first surface of the first dielectric layer is in direct mechanical contact with the substrate, wherein the first crystallization accelerating layer is in direct mechanical contact with a second surface of the first dielectric layer, wherein the recording layer is in direct mechanical contact with the first crystallization accelerating layer, wherein the second crystallization accelerating layer is in direct mechanical contact with the recording layer, wherein the second dielectric layer is in direct mechanical contact with the second crystallization accelerating layer, wherein the second dielectric layer is disposed between the second dielectric layer and the reflecting layer, wherein the first dielectric layer includes a first dielectric material whose molecular composition is continuously distributed from the first surface of the first dielectric layer to the second surface of the first dielectric layer, wherein the recording layer has a melting point $T_{mp}$ and is able to change between an amorphous and a crystalline state, wherein the second crystallization accelerating layer is similar to the first crystallization accelerating layer, and wherein the first and second crystallization accelerating layers each:

comprise a material selected from the group consisting of a binary metal alloy, a semiconductor element, and a semiconductor alloy;

have a melting point $T_{mg}$ at least 250° C. higher than the melting point $T_{mp}$ of the recording layer; and have a crystal structure similar to the crystalline state of the recording layer.

5. The optical recording medium of claim 4, wherein the second crystallization accelerating layer is substantially equal both in thickness and in composition to the first crystallization accelerating layer.

6. The optical recording medium of claim 1, wherein the recording layer comprises an alloy of Q, In, Sb and Te, and wherein Q is selected from the group consisting of Ag and Ge.

7. The optical recording medium of claim 1, wherein the recording layer comprises an alloy of Ge, Sb and Te.

8. The optical recording medium of claim 1, wherein the substrate and stack are adapted to have a linear velocity of at least 7.2 m/s relative to a laser-light beam.

9. The optical recording medium of claim 1, wherein the crystallization accelerating layer comprises a material selected from the group consisting of Ge and Si.

10. The optical recording medium of claim 1, wherein the recording layer comprises $Ge_{50x}Sb_{40-40x}Te_{60-10x}$ (in atomic percentages), and wherein $0.166 \leq x \leq 0.444$.

11. The optical recording medium of claim 1, wherein the recording layer comprises $Q_aIn_bSb_cTe_d$ (in atomic percentages), wherein Q is selected from the group consisting of Ag and Ge, wherein $2 \leq a \leq 9$, wherein $0 < b \leq 6$, wherein $55 \leq c \leq 80$, wherein $16 \leq d \leq 30$, and wherein $a+b+c+d=100$.

12. The optical recording medium of claim 4, wherein the first and second crystallization accelerating layers each comprise a material selected from the group consisting of PbTe, $Ag_2Te$, and CrTe.

13. The optical recording medium of claim 4, wherein the first and second crystallization accelerating layers each comprise a material selected from the group consisting of Ge and Si.

14. The optical recording medium of claim 4, wherein the recording layer comprises $Ge_{50x}Sb_{40-40x}Te_{60-10x}$ (in atomic percentages), and wherein $0.166 \leq x \leq 0.444$.

15. The optical recording medium of claim 4, wherein the recording layer comprises $Q_aIn_bSb_cTe_d$ (in atomic percentages), wherein Q is selected from the group consisting of Ag and Ge, wherein $2 \leq a \leq 9$, wherein $0 < b \leq 6$, wherein $55 \leq c \leq 80$, wherein $16 \leq d \leq 30$, and wherein $a+b+c+d=100$.

16. An optical recording medium having a substrate and a stack of layers provided thereon, the stack comprising a recording layer, a reflecting layer, a crystallization accelerating layer, a first dielectric layer, and a second dielectric layer, the recording layer having a melting point $T_{mp}$ and being able to change between an amorphous and a crystalline state, the recording layer being disposed between the first and second dielectric layers, the first dielectric layer being adjacent to the substrate, the crystallization accelerating layer being in contact with the recording layer, the reflective layer being disposed between the substrate and the first dielectric layer, wherein the crystallization accelerating layer;

comprises a material selected from the group consisting of PbTe, $Ag_2Te$, and CrTe;

has a melting point $T_{mg}$ at least 250° C. higher than the melting point $T_{mp}$ of the recording layer; and has a crystal structure similar to the crystalline state of the recording layer.

17. The optical recording medium of claim 16, wherein the crystallization accelerating layer comprises a material selected from the group consisting of Ge and Si.

18. The optical recording medium of claim 16, wherein the recording layer comprises $Ge_{50x}Sb_{40-40x}Te_{60-10x}$ (in atomic percentages), and wherein $0.166 \leq x \leq 0.444$.

19. The optical recording medium of claim 16, wherein the recording layer comprises $Q_aIn_bSb_cTe_d$ (in atomic percentages), wherein Q is selected from the group consisting of Ag and Ge, wherein $2 \leq a \leq 9$, wherein $0 < b \leq 6$, wherein $55 \leq c \leq 80$, wherein $16 \leq d \leq 30$, and wherein $a+b+c+d=100$.

* * * * *